US007574953B2

(12) United States Patent
Tanaka

(10) Patent No.: US 7,574,953 B2
(45) Date of Patent: Aug. 18, 2009

(54) ROTARY CLAMP CYLINDER

(75) Inventor: Syuhei Tanaka, Inazawa (JP)

(73) Assignee: Owa Machinery, Ltd., Aichi-Ken (JP)

( * ) Notice: Subject to any disclaimer, the term of this patent is extended or adjusted under 35 U.S.C. 154(b) by 241 days.

(21) Appl. No.: 11/890,536

(22) Filed: Aug. 6, 2007

(65) Prior Publication Data

US 2009/0038471 A1 Feb. 12, 2009

(51) Int. Cl.
*B23Q 3/08* (2006.01)

(52) U.S. Cl. .......................................... 92/136; 269/24

(58) Field of Classification Search .................. 92/136; 269/24, 27, 32

See application file for complete search history.

(56) References Cited

U.S. PATENT DOCUMENTS 4,620,695 A * 11/1986 Vanistendael ................ 269/24
6,412,763 B1 7/2002 Noda et al.

FOREIGN PATENT DOCUMENTS

| | | |
|---|---|---|
| CN | 1298066 | 6/2001 |
| JP | 2000-087909 | 3/2000 |
| JP | 2004-003589 | 1/2004 |

* cited by examiner

*Primary Examiner*—F. Daniel Lopez
(74) *Attorney, Agent, or Firm*—Ladas and Parry LLP

(57) ABSTRACT

According to a rotary clamp cylinder of this invention, in a rod cover 5, attachment holes 18 are formed so as not to intersect an axis CL of a piston rod 11, and pin members 19 are rotatably fitted in the attachment holes 18, respectively. An amount L of engagement between each pin member 19 and each turning guide groove 14 becomes greater, on the side of the axis CL of the piston rod 11 in the pin member 19 than on the side opposite to the side of the axis CL of the piston rod 11, and the outer circumferential face 21 of each pin member 19 on the side opposite to the side of the axis CL of the piston rod 11 can be supported by the inner face of each attachment hole 18, over substantially the entire length thereof. Accordingly, excessively large load and/or impact could be received by the pin members 19, as such the increase of the transfer speed upon clamping or unclamping, and/or attachment of a longer clamper 12 to the piston rod 11 can be further facilitated.

7 Claims, 7 Drawing Sheets

ROTARY CLAMP CYLINDER

CROSS REFERENCE TO RELATED APPLICATIONS

This application corresponds to Japanese Patent Application No. 2005-281111 filed on Sep. 28, 2005 and published on Apr. 12, 2007 as JP 2007-092827 A, the entire contents of which are incorporated herein by reference.

TECHNICAL FIELD

The present invention relates to a rotary clamp cylinder.

BACKGROUND ART

In a typical rotary clamp cylinder, a cylinder body incorporates a piston therein, and a piston rod connected with the piston projects out from one end of the cylinder body. In the rotary clamp cylinder of this type, a plurality of guide members provided to the cylinder body are respectively engaged with a plurality of turning guide grooves provided in the piston rod, such that the piston rod is turned as well as moved in the axial direction, due to movement of the piston, so as to clamp a work by using a clamper provided to the piston rod. In the past, the guide members have been known as engaging balls (steel balls), as described in JP 3621082 B (Patent Document 1), or known as pins each having a distal end oriented in the direction toward the axis of the piston rod, as described in JP 2000-87909 A (Patent Document 2).

DISCLOSURE OF THE INVENTION

In the rotary clamp cylinder described above, the moment of inertia to be applied to the piston rod is increased, when increasing the transfer speed of the piston in order to raise the operation speed of clamping and/or unclamping a work, or when attaching a longer clamper to the piston rod. In the case where the moment of inertia applied to the piston rod is increased in such a manner, excessively large load and/or impact will be applied to the guide members and the turning guide grooves. If the rotary clamp cylinder is of a type that the engaging balls are respectively fitted in the circular turning guide grooves, as described in the Patent Document 1, when the engaging balls could not be rotated, significantly large frictional force tends to be caused between the engaging balls and the turning guide grooves. Alternatively, if the rotary clamp cylinder is of a type that the pins are engaged with the turning guide grooves, as described in the Patent Document 2, the distal end of each pin projecting through each groove tends to absorb excessively large load and/or impact, as such damaging the pin earlier than expected. Therefore, in the conventional art, the increase of the operation speed of clamping and/or unclamping a work or the attachment of a longer clamper to the piston rod could not be achieved with ease.

The present invention has been made to solve the problems described above, and therefore, it is an object of this invention to provide a rotary clamp cylinder which can readily achieve the increase of the operation speed of clamping and/or unclamping a work and/or the attachment of a longer clamper to the piston rod.

The present invention is characterized by a rotary clamp cylinder configured such that a piston rod connected with a piston projects out from one end of a cylinder body incorporating the piston therein, and such that a plurality of guide members provided to the cylinder body are engaged with a plurality of turning guide grooves provided in the piston rod, so that the piston rod can be rotated as well as moved in the axial direction, due to movement of the piston, whereby a clamper provided to the piston rod can clamp a work, wherein the guide members are composed of pin members, wherein a plurality of attachment holes are formed in the cylinder body such that axes of the holes do not intersect the axis of the piston rod, and wherein the pin members are rotatably fitted respectively in the plurality of attachment holes.

The present invention is characterized by the rotary clamp cylinder described above, wherein one of hole axes of at least two of the plurality of attachment holes extends toward the piston rod and passes through the right side of the axis of the piston rod, while the other hole axis passes through the left side of the axis of the piston rod, and wherein in the at least two attachment holes, an amount of engagement between the pin member fitted in each attachment hole and the corresponding turning guide groove becomes greater on the reverse side of each pin member relative to each other with respect to the rotational direction about the axis of the piston rod.

The present invention is characterized by the rotary clamp cylinder described above, wherein two pairs of attachment holes are provided to be symmetrical about the cylinder central axis in the cylinder body, and wherein the one pair of attachment holes extend toward the piston rod and pass through the right side of the axis of the piston rod, while the other pair pass through the left side of the axis of the piston rod, respectively.

The present invention is characterized by the rotary clamp cylinder described above, wherein an end portion on the side of the piston rod of each pin member fitted in each attachment hole includes two side edges, wherein one of the side edges opposite to the other edge located on the side of the axis of the piston rod is positioned adjacent to an inner opening of the attachment hole, wherein the other edge located on the side of the axis of the piston is provided to project toward the piston rod from the inner opening of the attachment hole, whereby an outer circumferential face of the pin member, which is opposite to the axis of the piton rod, can be supported by the inner face of the attachment hole, over substantially the entire length thereof.

In the present invention, the guide members of the rotary clamp cylinder are composed of the pin members, and the pin members are rotatably fitted respectively in the plurality of attachment holes provided in the cylinder body such that their hole axes do not intersect the axis of the piston rod. Thus, the amount of engagement between each pin member and each turning guide groove becomes greater, on the side of the axis of the piston rod in the pin member than on the side opposite to the side of the axis of the piston rod, and the outer circumferential face of each pin member on the side opposite to the side of the axis of the piston rod can be supported by the inner face of each attachment hole, over substantially the entire length thereof. Accordingly, excessively large load and/or impact could be received by the pin members, as such increase of the transfer speed upon clamping or unclamping, and/or attachment of a longer clamper to the piston rod can be further secured and facilitated.

In addition, in the present invention, at least two of the attachment holes are configured such that the hole axis of one of these holes extends toward the piston rod to pass through the right side of the axis of the piston rod, and the other passes through the left side of the axis of the piston rod. As such, in the at least two attachment holes, the amount of engagement between the pin member fitted in each attachment hole and the corresponding turning guide groove becomes greater, on the reverse side of the pin member, with respect to the rotational direction about the axis of the piston rod, relative to each other. Therefore, excessively large load and/or impact to be applied in either of the rotation directions of the piston rod can be securely received by at least one of the pin members.

In the present invention, since two pairs of attachment holes are provided to be symmetrical about the cylinder central axis in the cylinder body, wherein the one pair of attachment holes extend toward the piston rod and pass through the right side of the axis of the piston rod, while the other pair pass through the left side of the axis of the piston rod, respectively, excessively large load and/or impact to be applied in either of the rotational directions of the piston rod can be received stably by two pairs of pin members.

Furthermore, in the present invention, since an end portion on the side of the piston rod of each pin member fitted in each attachment hole includes two side edges, wherein one of the side edges opposite to the other edge located on the side of the axis of the piston rod is positioned adjacent to an inner opening of the attachment hole, wherein the other edge located on the side of the axis of the piston is provided to project toward the piston rod from the inner opening of the attachment hole, whereby an outer circumferential face of the pin member, which is opposite to the axis of the piton rod, can be supported by the inner wall of the attachment hole, over substantially the entire length thereof, breakage or damage of each pin member can be prevented even in the case where excessively large load/or impact is exerted on the pin member.

PREFERRED EMBODIMENT FOR CARRYING OUT THE INVENTION

Figure 1:
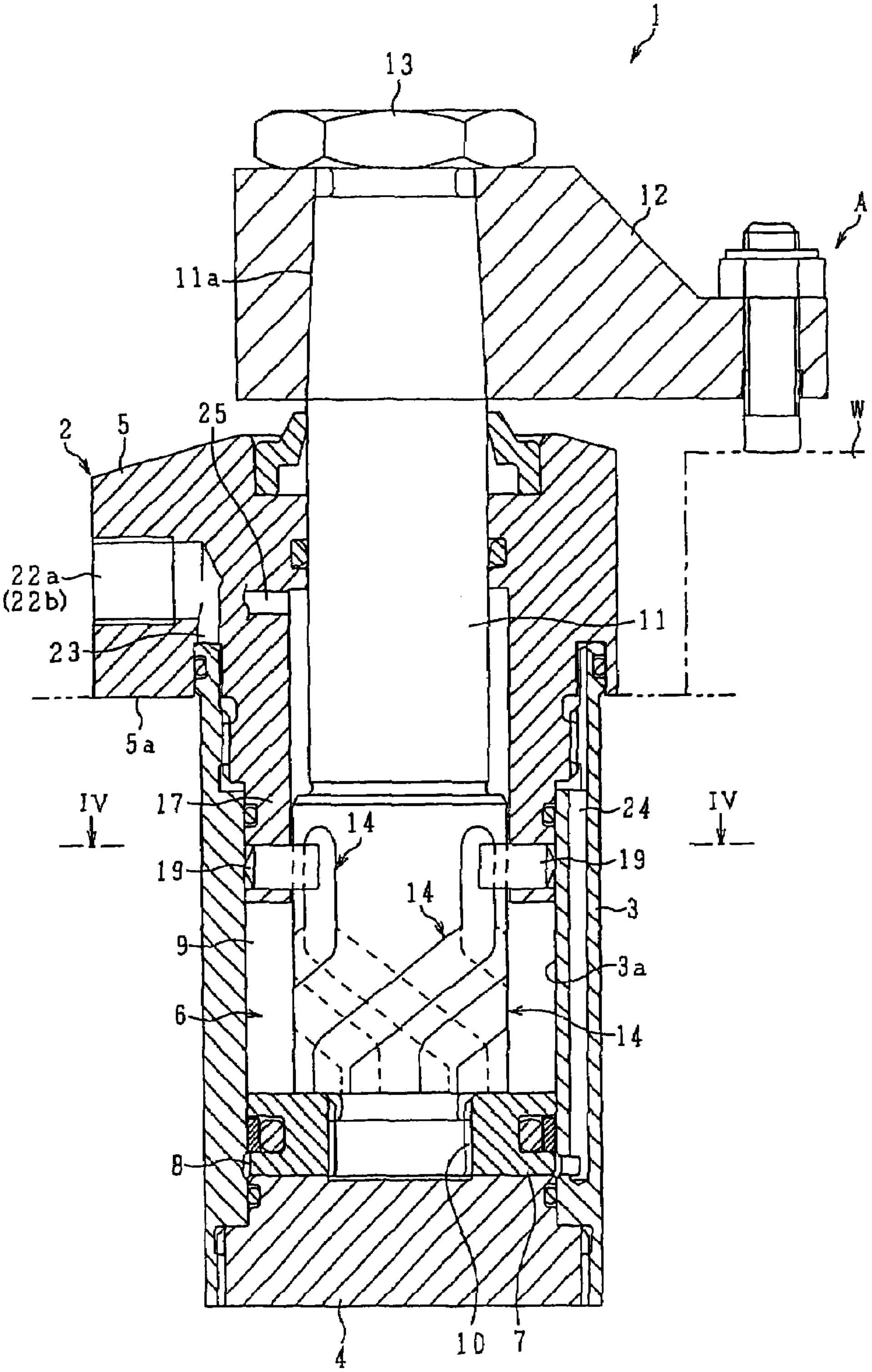
FIG. 1 is a longitudinal section of a rotary clamp cylinder, in a clamping state, according to one embodiment of the present invention.
Figure 5:
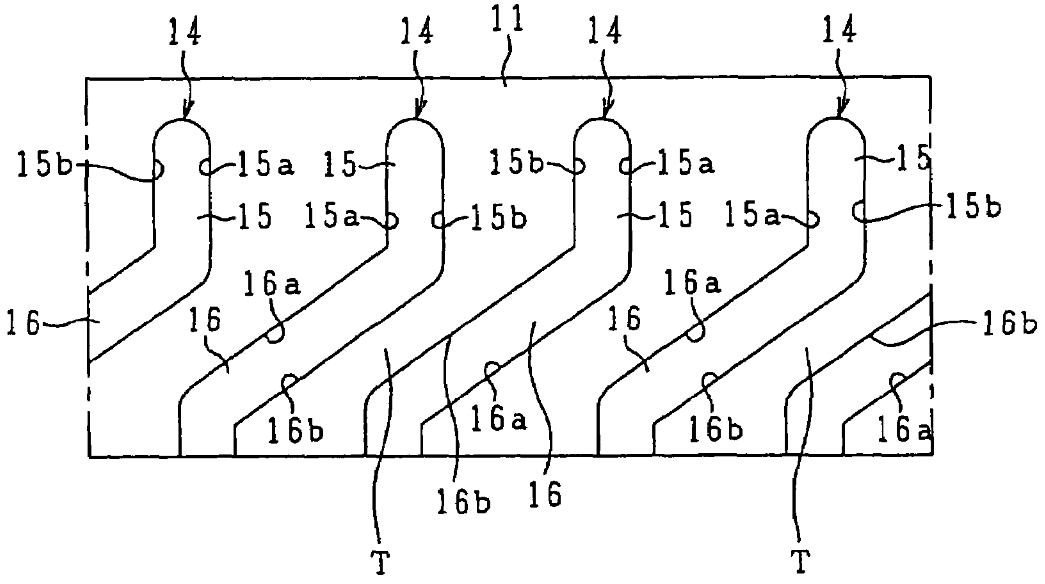
FIG. 5 is a development of an outer circumferential face of a piston rod.

A cylinder body 2 of a rotary clamp cylinder 1 shown in FIG. 1 includes a cylinder tube 3 provided with a cylinder hole 3*a*. The cylinder tube 3 is closed at its both ends by a head cover 4 and a rod cover 5, so as to define a cylinder chamber 6 therein. In the cylinder chamber 6, an annular piston 7 is inserted to be moved in the axial direction, dividing the cylinder chamber 6 into a head-side cylinder chamber 8 and a rod-side cylinder chamber 9. A bottom end portion of a piston rod 11 is engaged with a female screw 10 provided in the piston 7. A top end portion of the piston rod 11 projects out forward in the axial direction from the rod cover 5, with a clamper 12 fixed to a tapered face 11*a* of the top end portion by using a nut 13. In an outer circumferential face of the piston rod 11, a plurality of (in this embodiment, four) turning guide grooves 14 are provided, as shown in FIG. 5. Each turning guide groove 14 comprises a cam groove 15 formed in the axial direction and an angled cam groove 16 formed substantially in the circumferential direction. A guide face 15*a* of the cam groove 15 and a guide face 16*a* of the cam groove 16 are connected with each other. As shown in FIGS.

4 and 5, while a wall T is provided between the connecting cam grooves 15, 16 and side faces 15*b*, 16*b* formed in an adjacent turning guide groove 14, the side faces 15*b*, 16*b* may be eliminated in this embodiment, as such the wall T may be removed by a machining process. In this embodiment, guide members 19, each configured to be engaged with each corresponding turning guide groove 14, are formed in the rod cover 5 of the cylinder body 2.

Figure 4:
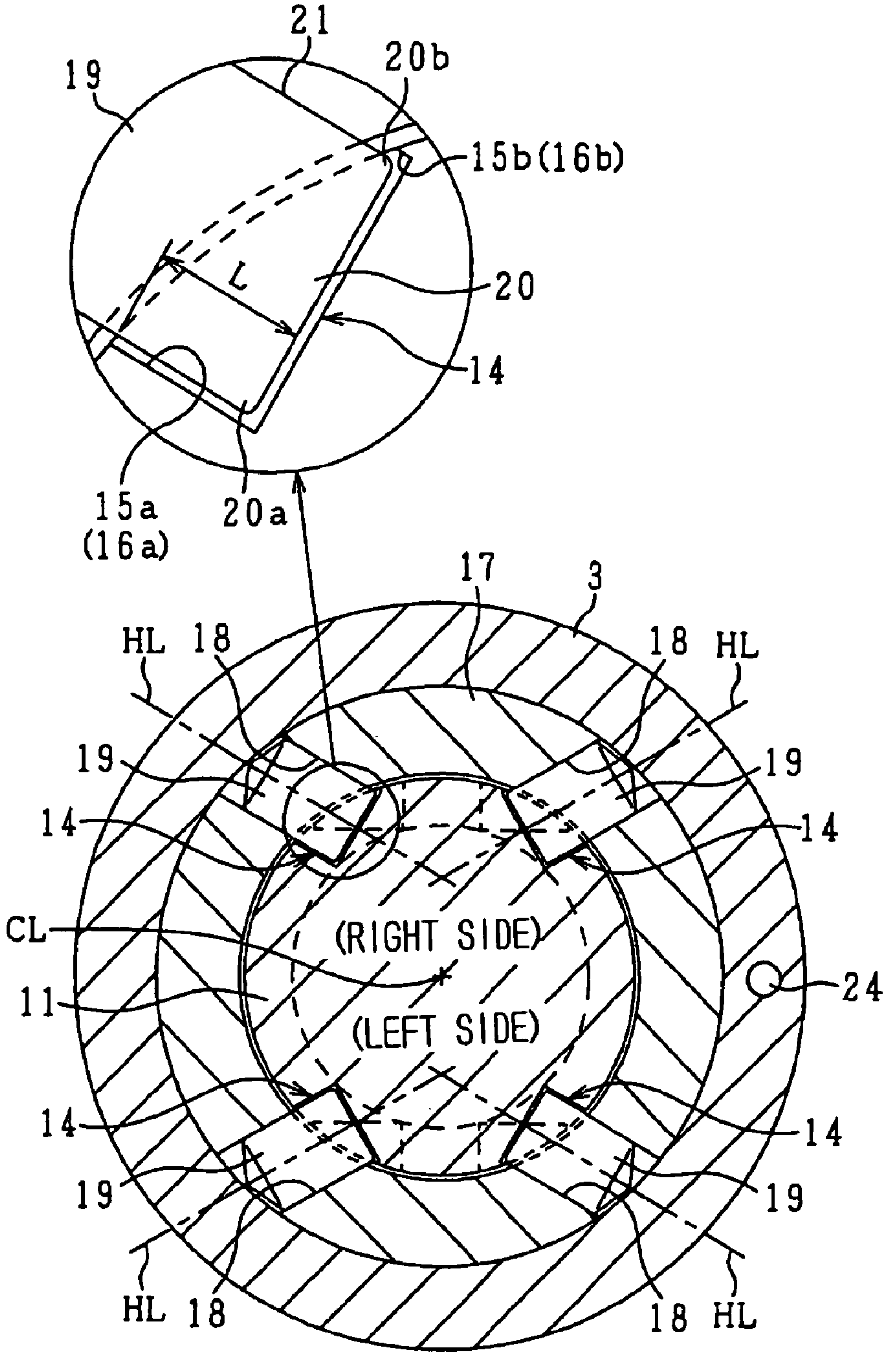
FIG. 4 is a section taken along line IV-IV of FIG. 1.

The rod cover 5 is of a substantially rectangular shape extending more outward in the radial direction than the outer shape of the cylinder tube 3. An annular shaft 17 fitted in the cylinder hole 3*a* projects outward from a bottom face 5*a* of the rod cover 5. The shaft 17 includes a plurality of (in this embodiment, four) attachment holes 18 such that each hole axis HL of the attachment holes does not intersect an axis CL (in the longitudinal direction) of the piston rod 11. In the attachment holes 18, pin members 19 constituting the guide members are rotatably fitted, respectively. In FIG. 4, two pairs of attachment holes 18 are provided symmetrically about the cylinder central axis (the axis CL of the piston rod 11) in the shaft 17 of the rod cover 5. The one pair of attachment holes 18 are arranged such that they extend toward the piston rod 11 and pass through the right side of the axis CL of the piston rod, while the other pair of attachment holes 18 are provided to pass through the left side of the axis CL of the piston rod.

An end portion 20 on the side of the piston rod 11 of each pin member 19 fitted in each attachment hole 18 includes two side edges 20*a* and 20*b*. The side edge 20*b* opposite to the other edge 20*a* on the side of the axis CL of the piston rod 11 is positioned in the vicinity of an inner opening of the attachment hole 18. The other edge 20*a* on the side of the axis CL of the piston 11 is provided to project toward the piston rod 11 from the inner opening of the attachment hole 18. As such, an outer circumferential face 21 of the pin member 19, which is opposite to the axis CL of the piton rod 11, is supported by an inner face of the attachment hole 18, over substantially the entire length thereof. It should be noted that at least two of the attachment holes 18 are configured such that the hole axis HL of one of these holes extends toward the piston rod 11 to pass through the right side of the axis CL of the piston rod 11, and the other one passes through the left side of the axis CL of the piston rod 11. As such, in the at least two holes 18, the amount L of engagement between each pin member 19 fitted in each attachment hole 18 and each corresponding turning guide groove 14 is designed to be greater, on the reverse side of each pin member 19, with respect to the turning direction about the axis CL of the piston rod 11, relative to each other.

Figure 6A:
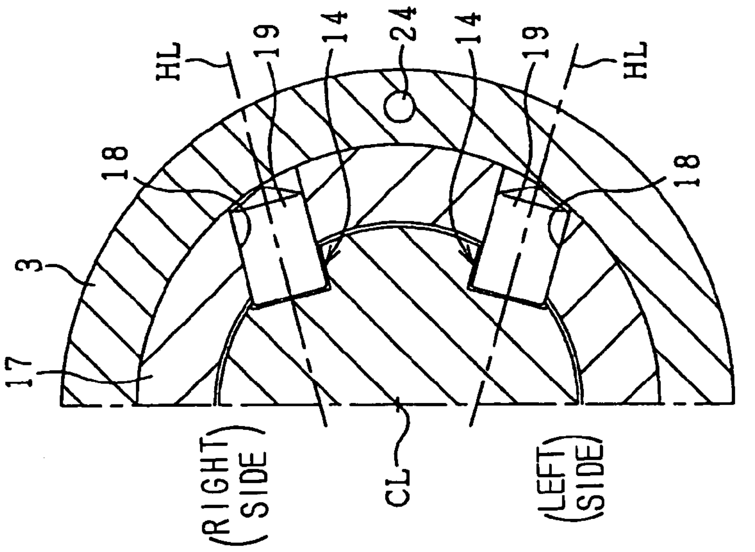
FIGS. 6A to 6C are diagrams, respectively showing arrangement of pin members.
Figure 6B:
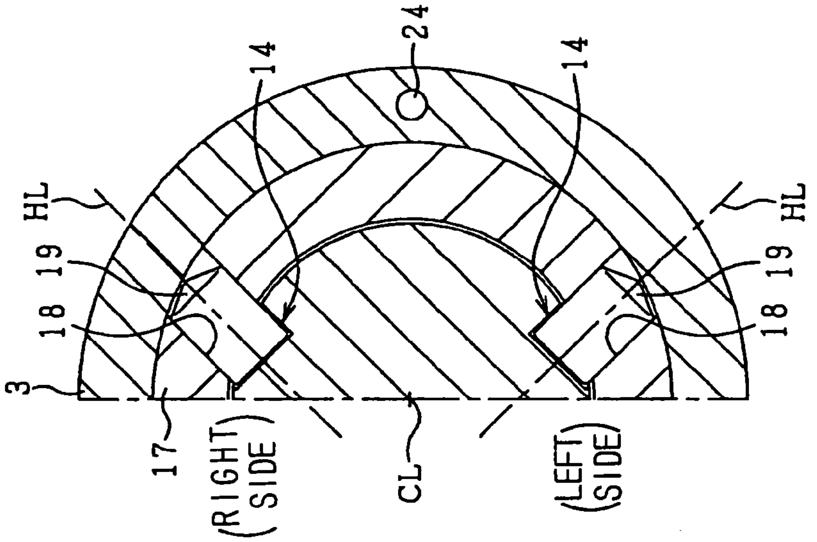
Figure 6C:
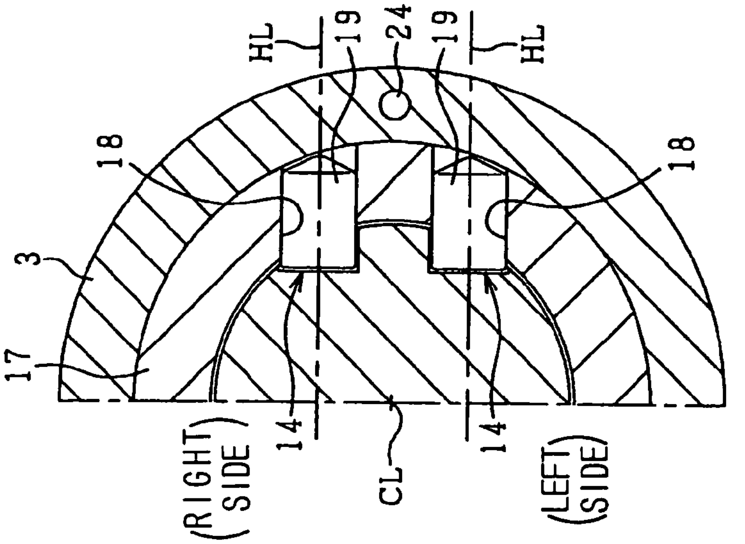
Figure 7A:
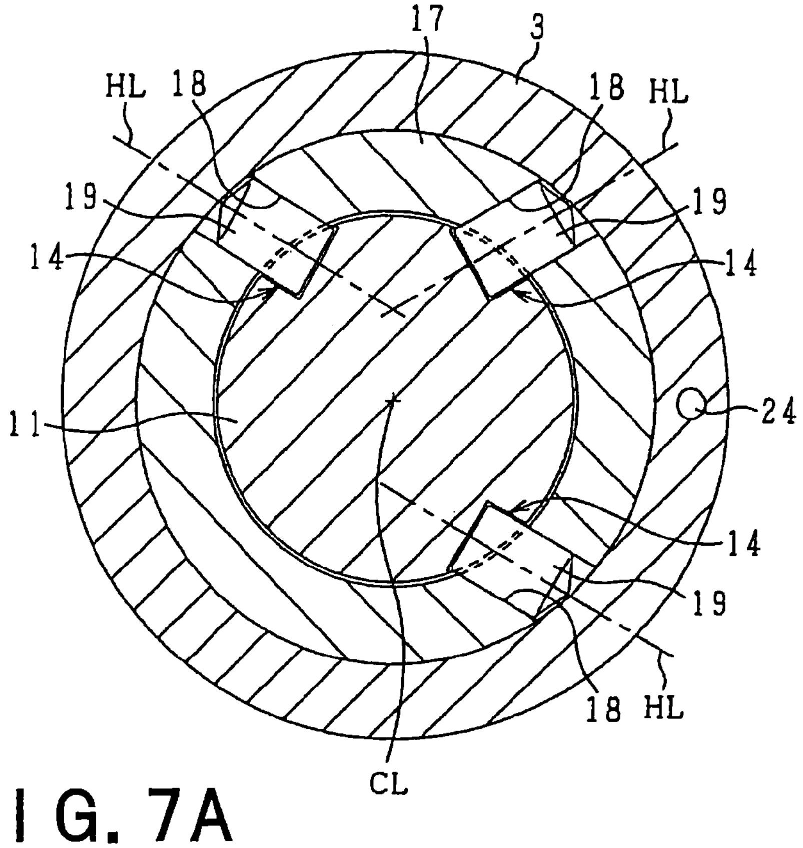
FIGS. 7A and 7B are diagrams, respectively showing another arrangement of the pin members.
Figure 7B:
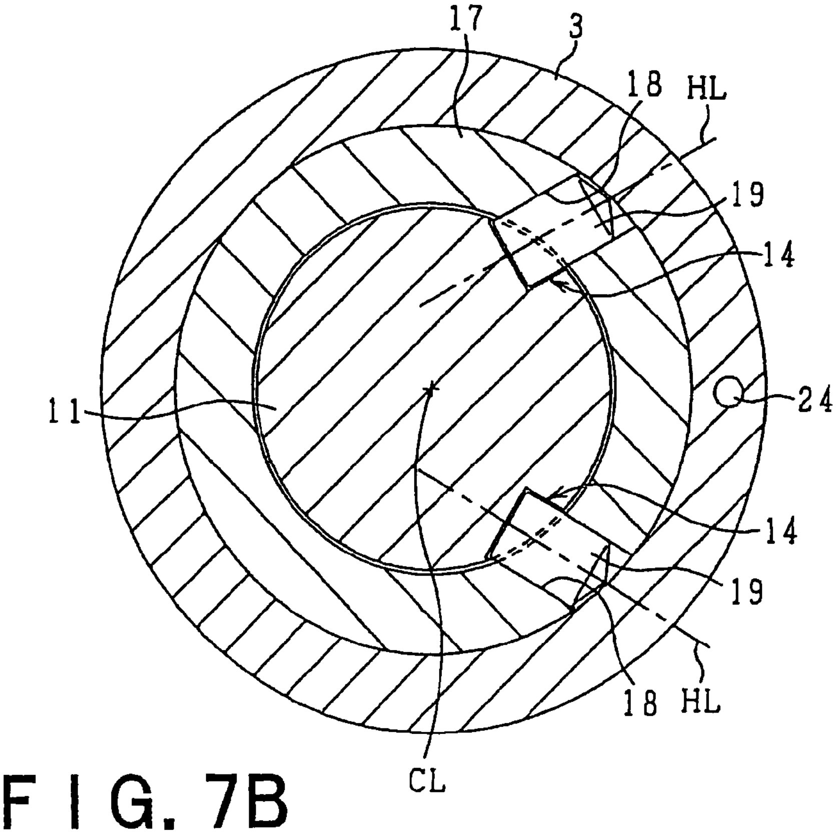

The arrangement of the pin members 19 may be those as shown in FIGS. 6A to 6C. In FIG. 6A, the hole axes HL of the pair of attachment holes 18, i.e., the axes of the pair of pin members 19, are provided such that they define together an angle of approximately 30 degrees. In FIG. 6B, the hole axes HL of the pair of attachment holes 18, i.e., the axes of the pair of pin members 19, are provided such that they define together an angle of approximately 90 degrees. In FIG. 6C, the hole axes HL of the pair of attachment holes 18, i.e., the axes of the pair of pin members 19, are provided such that they become parallel to each other. It should be appreciated that while the four pin members 19 are provided in this embodiment, two or more pin members 19 may be provided, as shown in FIGS. 7A and 7B, in order to achieve intended features of this invention. In one side face of the rod cover 5, a pair of supply and discharge ports 22 are provided. One of the supply and discharge ports 22*a* is in communication with a passage 24 provided along the longitudinal direction of the cylinder tube 3, via a fluid passage 23 of the rod cover 5. The other supply and discharge port 22*b* is in communication with the rod-side cylinder chamber 9, via another fluid passage 25 of the rod cover 5.

Figure 2:
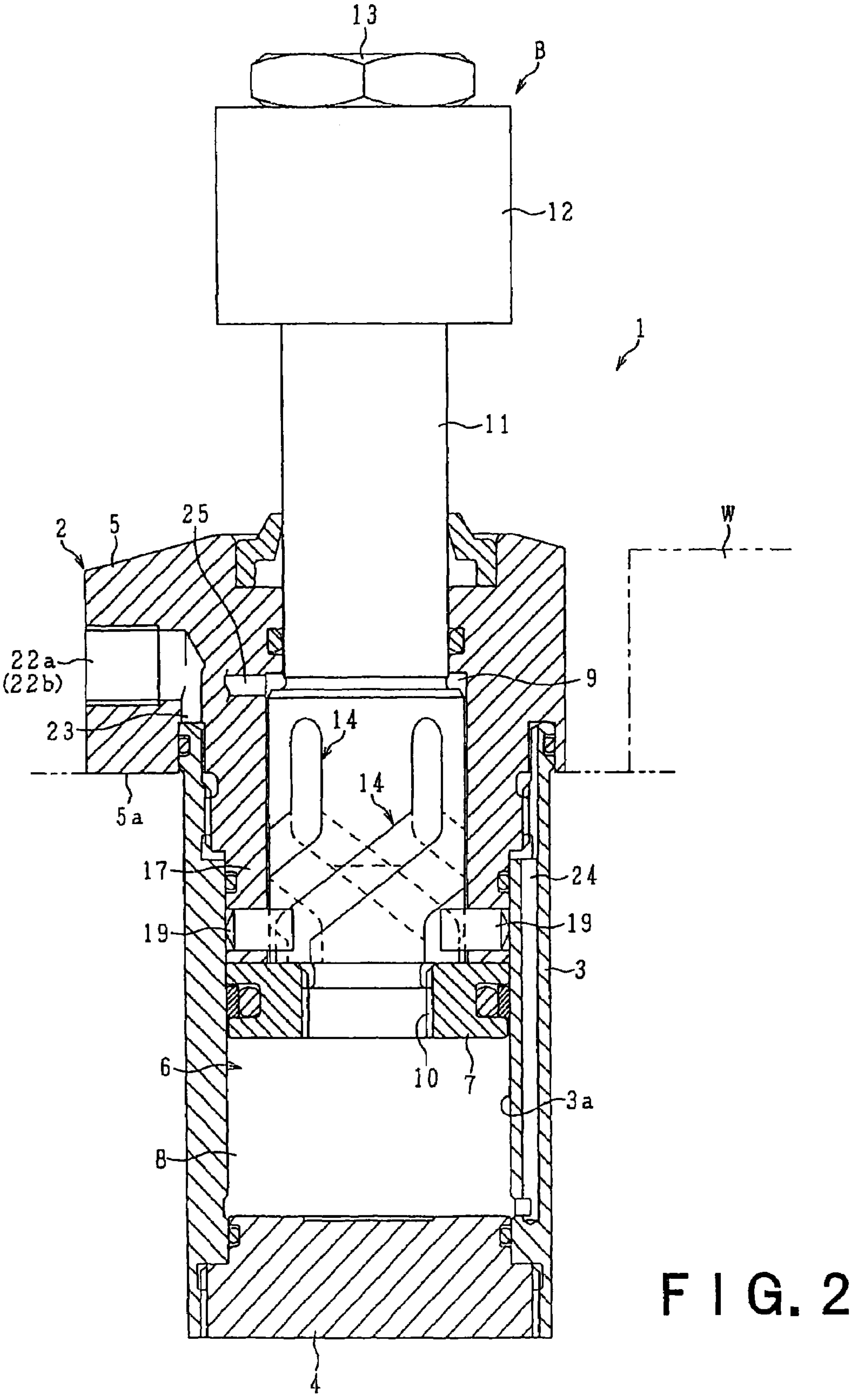
FIG. 2 is a longitudinal section of the rotary clamp cylinder, in an unclamping state.
Figure 3:
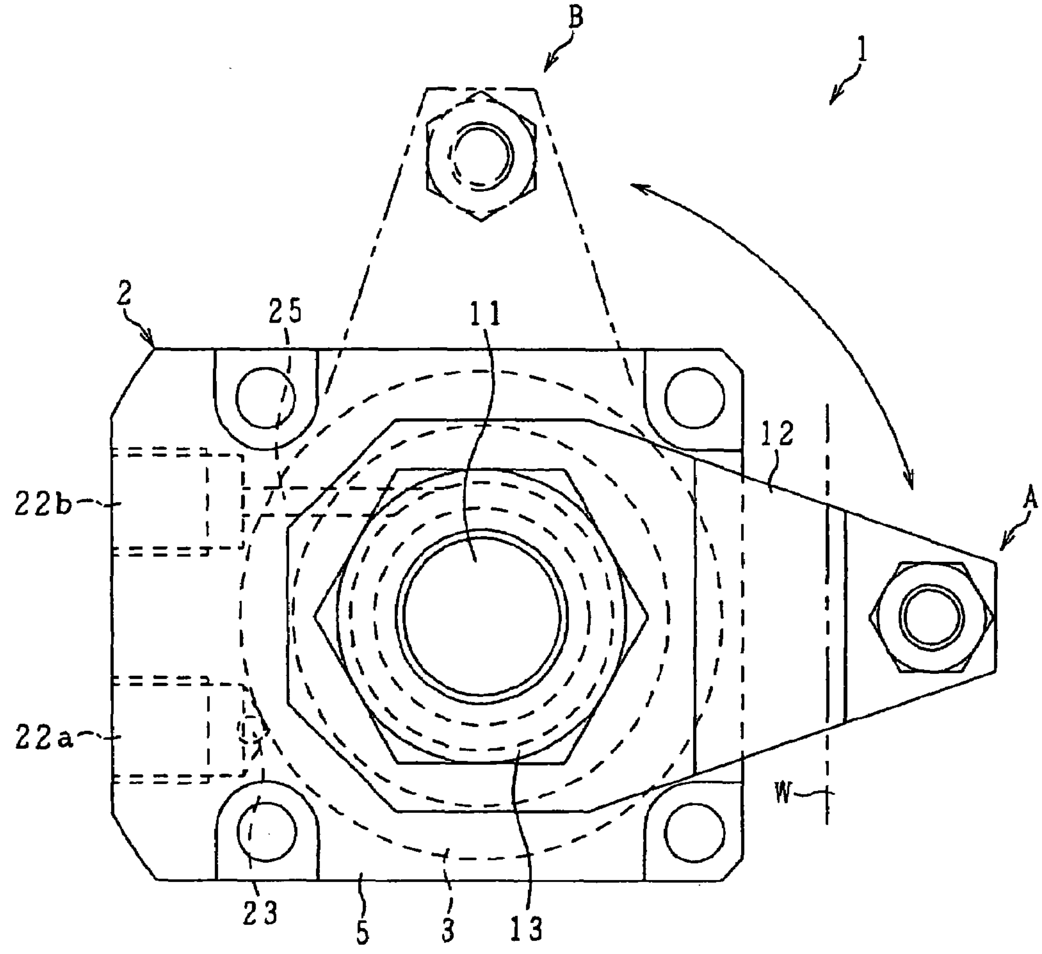
FIG. 3 is a plan view of FIG. 1.

Next, the operation of the rotary clamp cylinder 1 will be described. When a pressurized fluid is supplied into the rod-side cylinder 9 via the fluid passage 25 from the other supply and discharge port 22*b* while the clamper 12 is in an unclamping position B as shown in FIG. 2, the piston 7 is moved downward in the axial direction, and the piston rod 11 is moved downward in the axial direction along the turning guide grooves 14 engaged with the pin members 19, while rotating by 90 degrees. Thereafter, the piston rod 11 is lowered toward the work W while keeping the turned position, so as to clamp the work W in a clamping position A. When a pressurized fluid is supplied into the head-side cylinder 8 via the fluid passage 23 and passage 24 from the supply and discharge port 22*a* while the clamper 12 is in the clamping position A as shown in FIG. 1, the piston 7 is moved upward in the axial direction, and the piston rod 11 is hence moved reversely to the movement described above. As such, the clamper 12 will be in the unclamping state B.

In the rotary clamp cylinder 1, if the moment of inertia to be applied to the piston rod 11 would be increased, due to increase of the transfer speed of the piston 7 in order to raise the operation speed of clamping and/or unclamping the work W, or due to attachment of a longer clamper 12 to the piston rod 11, excessively large load and/or impact would be applied to the pin members 19 and the turning guide grooves 14. However, in the rod cover 5 of the embodiment according to the present invention, the pin members 19 are each rotatably fitted in the plurality of attachment holes 18 each provided not to intersect the axis CL of the piston rod 11. Therefore, the amount L of engagement between each pin member 19 and each turning guide groove 14 becomes greater, on the side of the axis CL of the piston rod 11 in the pin member 19, than on the side opposite to the side of the axis CL of the piston rod 11, and the outer circumferential face 21 of each pin member 19 on the side opposite to the side of the axis CL of the piston rod 11 can be supported by the inner face of each attachment hole 18, over substantially the entire length thereof. Accordingly, the excessively large load and/or impact can be received by the pin members 19, as such the increase of the transfer speed upon clamping or unclamping, and/or the attachment of a longer clamper 12 to the piston rod 11 can be further facilitated. Since each pin member 19 is in linear contact with each corresponding turning guide groove 14, not so great frictional force as in the conventional art described above would be caused between the pin member 19 and the turning guide groove 14, even in the case where the pin member 19 engaged with the turning guide groove 14 could not be rotated.

Since the at least two of the attachment holes 18 are configured such that the hole axis HL of one of these holes extends toward the piston rod 11 to pass through the right side of the axis CL of the piston rod 11, and the other one passes through the left side of the axis CL of the piston rod 11, and the amount L of engagement between each pin member 19 fitted in each attachment hole 18 and each corresponding turning guide groove 14 is designed to be greater, on the reverse side of each pin member 19, with respect to the turning direction about the axis CL of the piston rod 11, relative to each other, excessively large load and/or impact to be applied in both of the turning directions of the piston rod 11 can be securely received by at least one of the pin members 19. In addition, since the two pairs of attachment holes 18 are provided symmetrically about the cylinder central axis (the axis CL of the piston rod 11), in the rod cover 5, such that the axes of the one pair of attachment holes 18 are each arranged so as to extend toward the piston rod 11 and pass through the right side of the axis CL of the piston rod 11, while the other pair of attachment holes 18 pass through the left side of the axis CL of the piston rod 11, excessively large load and/or impact to be applied in both of the turning directions of the piston rod 11 can be securely received by the two corresponding sets of pairs of pin members 19. Furthermore, since the end portion 20 on the side of the piston rod 11 of each pin member 19 fitted in each attachment hole 18 includes two side edges 20*a* and 20*b*, such that the side edge 20*b* opposite to the other edge 20*a* on the side of the axis CL of the piston rod 11 is positioned in the vicinity of the inner opening of the attachment hole 18, while the other edge 20*a* on the side of the axis CL of the piston 11 is provided to project toward the piston rod 11 from the inner opening of the attachment hole 18, the outer circumferential face 21 opposite to the side of the axis CL of the piston rod 11 in the pin member 19 can be supported by the inner face of the attachment hole 18, over the entire length thereof. Therefore, damage or breakage of each pin member 19 can be prevented even in the case where excessively large load or impact would be applied to the pin member 19.

While preferred examples of the present invention have been described specifically to some extent, it is apparent to those skilled in art that various modifications can be made to them. Accordingly, it should be understood that the present invention can be carried out, in other aspects than those specifically shown and described herein, without departing from the scope and sprit of this invention.

What is claimed is:

1. A rotary clamp cylinder configured such that a piston rod connected with a piston projects out from one end of a cylinder body incorporating the piston therein, and such that a plurality of guide members provided to the cylinder body are engaged with a plurality of turning guide grooves provided in the piston rod, so that the piston rod can be rotated as well as moved in an axial direction, due to movement of the piston, whereby a clamper provided to the piston rod can clamp a work, wherein the guide members are composed of pin members, wherein a plurality of attachment holes are formed in the cylinder body such that axes of the holes do not intersect an axis of the piston rod, and wherein the pin members are rotatably fitted respectively in the plurality of attachment holes.

2. The rotary clamp cylinder according to claim 1, wherein one of hole axes of at least two of the plurality of attachment holes extends toward the piston rod and passes through a right side of the axis of the piston rod, while an other hole axis passes through a left side of the axis of the piston rod, and wherein in the at least two attachment holes, an amount of engagement between the pin member fitted in each attachment hole and a corresponding turning guide groove becomes greater on an reverse side of each pin member relative to each other with respect to a rotational direction about the axis of the piston rod.

3. The rotary clamp cylinder according to claim 2, wherein two pairs of attachment holes are provided to be symmetrical about a cylinder central axis in the cylinder body, and wherein one pair of attachment holes extend toward the piston rod and pass through a right side of the axis of the piston rod, while an other pair pass through a left side of the axis of the piston rod.

4. The rotary clamp cylinder according to claim 2, wherein an end portion on a side of the piston rod of each pin member fitted in each attachment hole includes two side edges, wherein one of the side edges opposite to an other edge located on a side of the axis of the piston rod is positioned adjacent to an inner opening of the attachment hole, wherein the other edge located on the side of the axis of the piston is provided to project toward the piston rod from the inner opening of the attachment hole, whereby an outer circumferential face of the pin member, which is opposite to the axis of the piton rod, can be supported by an inner face of the attachment hole, over substantially entire length thereof.

5. The rotary clamp cylinder according to claim 1, wherein an end portion on a side of the piston rod of each pin member fitted in each attachment hole includes two side edges, wherein one of the side edges opposite to an other edge located on a side of the axis of the piston rod is positioned adjacent to an inner opening of the attachment hole, wherein the other edge located on the side of the axis of the piston is provided to project toward the piston rod from the inner opening of the attachment hole, whereby an outer circumferential face of the pin member, which is opposite to the axis of the piton rod, can be supported by an inner face of the attachment hole, over substantially entire length thereof.

6. The rotary clamp cylinder according to claim 1, wherein two pairs of attachment holes are provided to be symmetrical about a cylinder central axis in the cylinder body, and wherein one pair of attachment holes extend toward the piston rod and pass through a right side of the axis of the piston rod, while an other pair pass through a left side of the axis of the piston rod.

7. The rotary clamp cylinder according to claim 6, wherein an end portion on a side of the piston rod of each pm member fitted in each attachment hole includes two side edges, wherein one of the side edges opposite to an other edge located on a side of the axis of the piston rod is positioned adjacent to an inner opening of the attachment hole, wherein the other edge located on the side of the axis of the piston is provided to project toward the piston rod from the inner opening of the attachment hole, whereby an outer circumferential face of the pin member, which is opposite to the axis of the piton rod, can be supported by an inner face of the attachment hole, over substantially entire length thereof.

* * * * *

UNITED STATES PATENT AND TRADEMARK OFFICE

CERTIFICATE OF CORRECTION

PATENT NO. : 7,574,953 B2
APPLICATION NO. : 11/890536
DATED : August 18, 2009
INVENTOR(S) : Syuhei Tanaka It is certified that error appears in the above-identified patent and that said Letters Patent is hereby corrected as shown below:

Title Page, Item (73), Assignee: "Owa" should read --Howa--.

Signed and Sealed this

Ninth Day of March, 2010

David J. Kappos
*Director of the United States Patent and Trademark Office*